Aug. 20, 1963    F. VAN ENDERT    3,101,045
CHARGING BOX FOR A MACHINE FOR OPERATING
ON METAL OR SIMILAR SCRAP
Filed Sept. 19, 1960    6 Sheets-Sheet 3

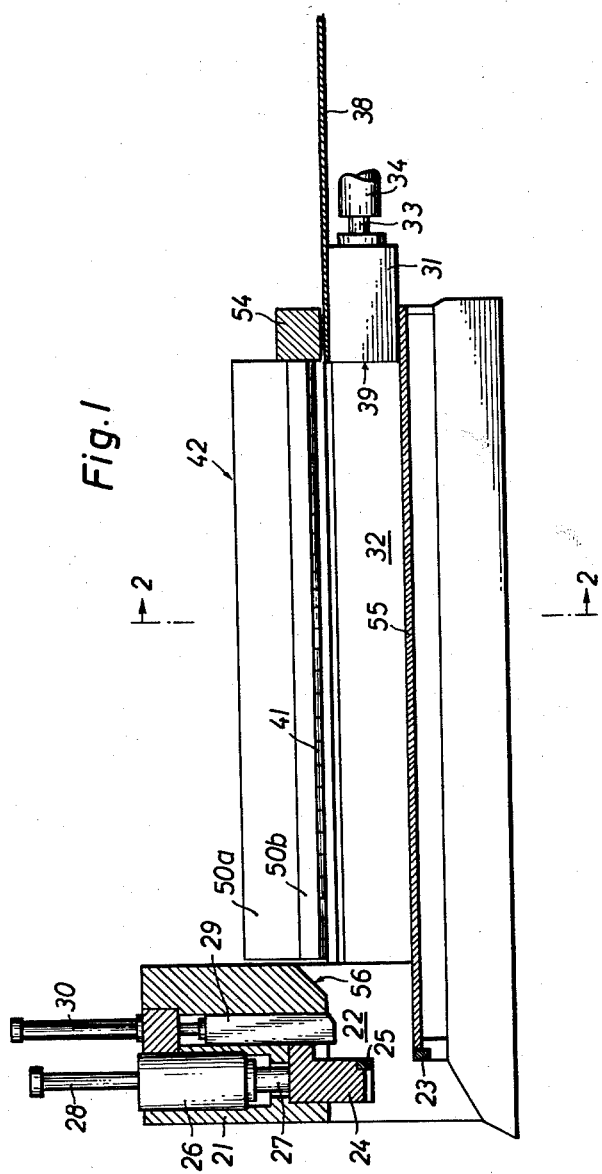

INVENTOR
Fritz von Endert
BY
attorney

Aug. 20, 1963  F. VAN ENDERT  3,101,045
CHARGING BOX FOR A MACHINE FOR OPERATING
ON METAL OR SIMILAR SCRAP
Filed Sept. 19, 1960  6 Sheets-Sheet 6

INVENTOR

United States Patent Office 3,101,045
Patented Aug. 20, 1963

3,101,045
CHARGING BOX FOR A MACHINE FOR OPERATING ON METAL OR SIMILAR SCRAP
Fritz van Endert, Dusseldorf-Oberkassel, Germany, assignor to Waldemar Lindemann, Dusseldorf, Germany
Filed Sept. 19, 1960, Ser. No. 56,759
Claims priority, application Germany Dec. 31, 1959
4 Claims. (Cl. 100—233)

My invention relates to machines for operating on metal scrap such as shears or baling presses and more specifically to the charging boxes usually incorporated therein. In such machines metal scrap is fed into an elongated charging box having an open top and is advanced therein to the shearing or pressing means by a charging ram the reciprocable head of which forms an end wall of the box. It will be well understood that the dimensions of such charging boxes limit the size of the scrap pieces to be operated on in the machines and therefore it has been endeavored to adapt such machines for operation on oversized scrap pieces.

Thus it has been suggested to provide such charging boxes with a hinged cover which is adapted to at least partially press overflowing scrap or oversized scrap pieces into the charging box, thereby compacting the scrap into a smaller bundle and thus facilitating its feed to the shearing or pressing means. However, the effectiveness of such charging boxes is limited because the box cannot receive scrap having a width larger than its own width which may not exceed the operational width of the shearing or pressing means; this necessitated that such oversized pieces of scrap be reduced in size, usually by cutting with an acetylene torch, before they can be placed in the box. Also the said cover substantially prevents an efficient operation of the machine because the box cannot be charged from the side at which the cover is hinged to the box.

To avoid the said disadvantages and to provide a charging box capable to receive and to compress oversized bulky scrap into a bundle having smaller cross-sectional dimensions suitable for feeding directly into the shearing or pressing means of the machine, it has been suggested (Patent No. 2,932,247) to provide a charging box formed by a collapsible or foldable bottom wall and collapsible or foldable side walls; in such charging boxes their walls are collapsible or foldable from an initial position (enclosing a box space having a width sufficiently great to receive the largest scrap pieces) to a final position (enclosing a box space of a smaller width corresponding to the operation width of the shearing or pressing means). Such devices, however, require a quite large large space for their installation and operation, are complicated and sensitive in view of the many necessary hinges, and generally are not easy to operate. Furthermore, they have the very great disadvantage that the charging ram cannot be operated while scrap is being compacted in the collapsible charging box, so that compressing of oversized scrap on the one hand and feeding compressed scrap to the shearing or pressing means of the machine had to be performed at different times.

It is an object of my invention to avoid the limitations and disadvantages of said known machines and to provide a simple, easily and effectively operable charging box capable to receive oversized scrap and to feed the same quite continuously to the shearing or pressing means of the machine.

The said and other objects of my invention will be more fully understood from the following description when read with the accompanying drawings in which FIG. 1 shows schematically a longitudinal sectional view of my new charging box incorporated for example into a hydraulic shear for cutting metal scrap into smaller pieces, FIG. 2 shows a cross-sectional of the charging box along line 2—2 of FIG. 1, its compacting means being in initial open position;

Figure 3:
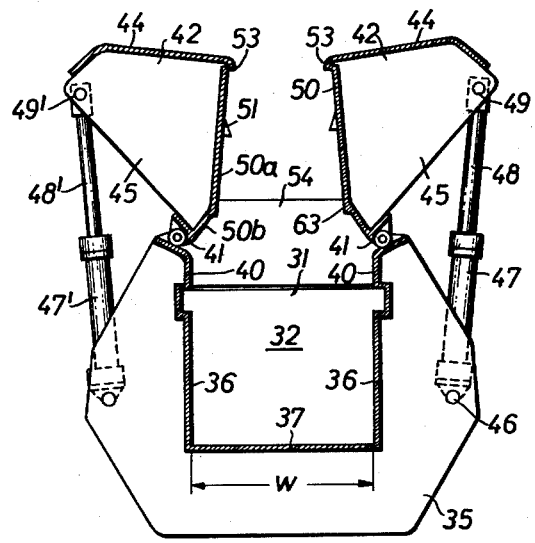
FIG. 3 shows a similar cross-sectional view its compacting means being in operational end position.

The hydraulic shear including my new charging box comprises a frame 21 with a passage opening 22 in which the shearing means (or in the case of a baling press the pressing mean) are located. The shearing means consist of a fixed longitudinal shear blade 23 and a cooperating shear blade 25 mounted upon a support 24 vertically reversible in said frame 21 by hydraulic actuating means comprising a working cylinder 26 with piston 27 and two retracting cylinders 27 (their pistons not being shown). In front of the cooperating shear blades 23, 25 may be arranged vertically operating compacting means adapted to reduce the height of the scrap fed to the shearing means 23, 25 (see FIGS. 11 and 12) said compacting means comprising one or more next to each other located press rams 29 which are preferably individually actuated by hydraulic cylinders 30.

Figure 8:
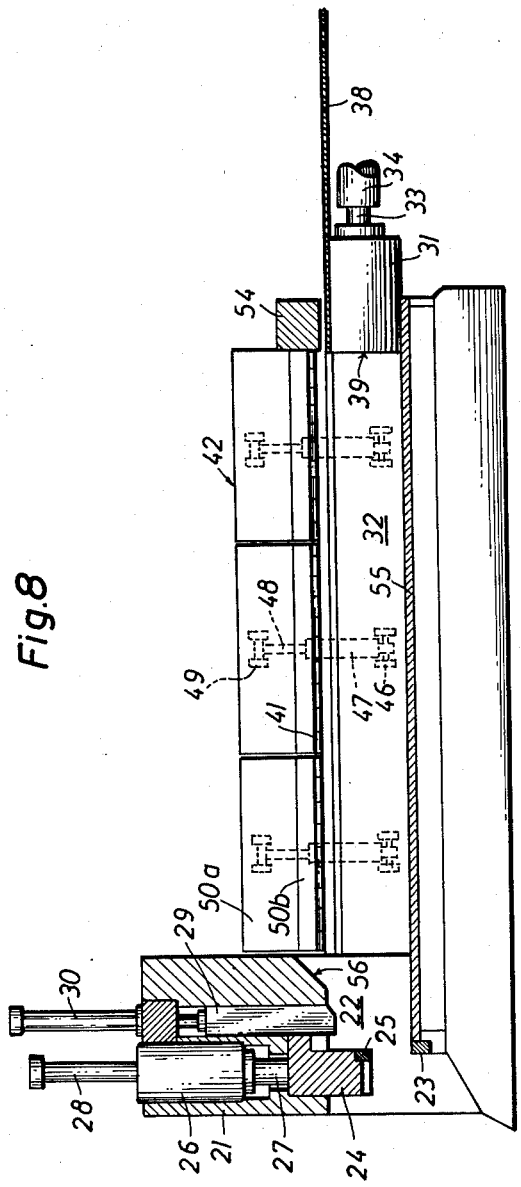
FIG. 8 shows a longitudinal sectional view of a modification of the embodiment shown in FIGS. 1 to 3.

The charging box 32 receiving scrap metal through its open top is enclosed by the side walls 36 and bottom wall 37 preferably made from heavy metal plates which are enforced and stiffened by ribs 35 or the like. The scrap placed into the charging box 32 is fed to the shearing means 23, 25, or in baling presses to the pressing means, by the head 31 of a charging ram operated by a piston 33 and a hydraulic cylinder 34. The face 39 of the ram head 31 corresponds at least substantially to the cross-sectional area of the box 32. A cover plate 38 attached to the top of the ram head 31 and moving therewith covers at all positions of the ram head 31 the space behind the same to prevent scrap to get there (FIGS. 1 and 8).

According to my invention I provide the charging box with compacting means outwardly extending from its top opening and preferably substantially coextending with the box in longitudinal direction thereof. These compacting means consist of a pair of cooperating swingable jaws each hinged to the upper edge of one of the sidewalls of the box (42 in FIGS. 1, 2 and 3, or 242 and 259 in FIG. 9).

Figure 2:
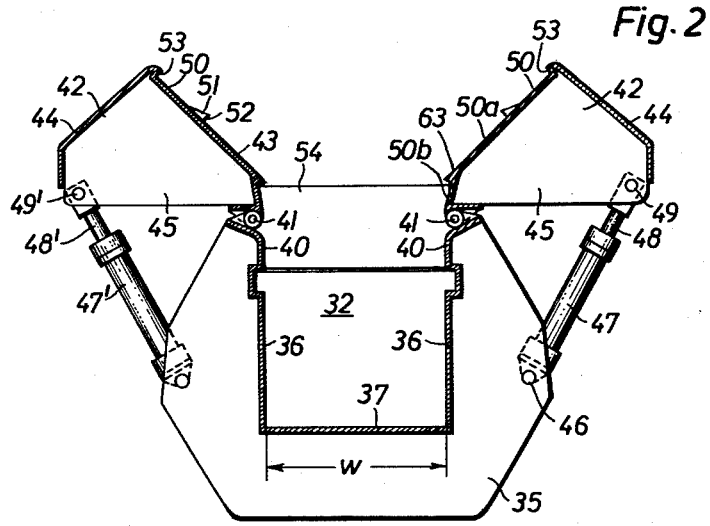

As shown in FIGS. 1, 2 and 3 one compacting jaw 42 substantially coextending in longitudinal direction with the charging box 32 is jointed by hinges 41 to each longitudinal edge 40 of the top opening of said box. One or both compacting jaws 42 may, however, be composed of two or more individually operable component jaws as illustrated in FIG. 8. Said jaws 42 are preferably welded from heavy sheet metal 43, 44 and are enforced and stiffened by ribs or the like 45. Each jaw 42, or each component thereof, is actuated by a hydraulic cylinder 47, 47′ pivotably mounted at 46 on the box and a piston or piston rod 48, 48′ connected thereto by a joint 49, 49′. The working faces 50 of the jaws 42 are provided with gripping means 51, 53 such as a plurality of noses, strips or ribs 51 which with their face 52 obstruct or prevent any upward movement of bodies along the said working faces 50 during the compacting action of the jaws.

It is advantageous to provide the working faces 50 of the jaws 42 with a convex bend 63 which divides each working face into a smaller inner portion 50b situated next to the hinge 41 and a larger outer portion 50a. The inner face portion 50b operates on a shorter lever and thus acts with increased force upon the scrap pieces introduced between the jaws 42; this is particularly important at the beginning of the pressing action upon oversized scrap pieces which actually offer a greater resistance against deformation.

The working faces 50 of the jaws 42 form in their initial inclined position shown in FIG. 2 a hopper relative to the charging box 32 and the jaws may remain in such position if scrap not exceeding the width of the box is being introduced thereinto. This scrap is then pushed by the charging ram 31 towards the operating end of the charging box where it is acted upon by press rams 29 and thereafter cut by the continuously operating shear blades 23, 25. In case that scrap is continued to be fed, for example by a magnetic crane, into the hopperlike space between the working faces of the jaws 42 while the charging ram 31 moves forward, a portion of the scrap continues to fall into the charging box in front of the charging ram 31 whereas the remainder falls upon the cover plate 38 described above from which it is pushed into the charging box 32 by the stationary stripping arm 54 during the return movement of said charging ram 31.

Scrap having a greater width than the width w of the charging box is compacted to such width by the jaws 42 which are once or repeatedly pivoted from their initial position shown in FIG. 2 into and out of the position shown in FIG. 3. Such operation upon an oversized scrap piece, such as an automobile body, will be hereinafter described with reference to FIGS. 4 to 9.

Figure 4:
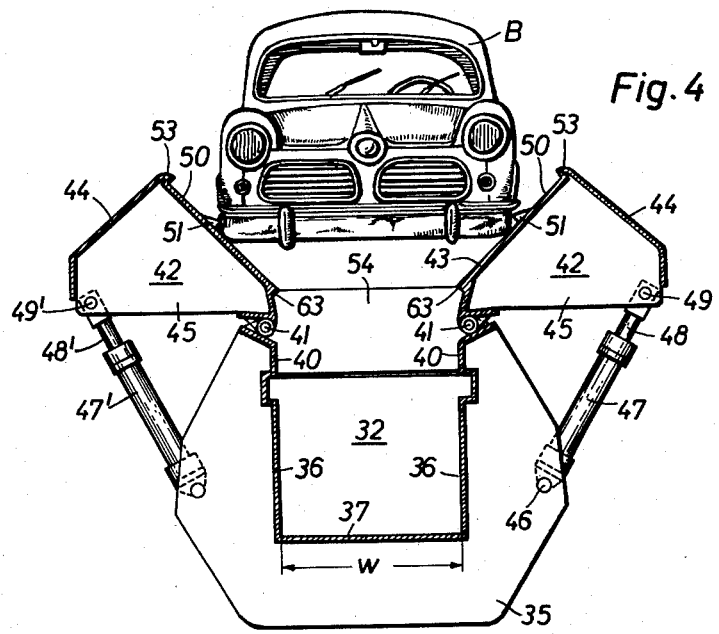
FIGS. 4 through 7 show similar cross-sectional views of the box and its compacting means in succeeding positions while acting upon bulky scrap such as an automobile body.
Figure 5:
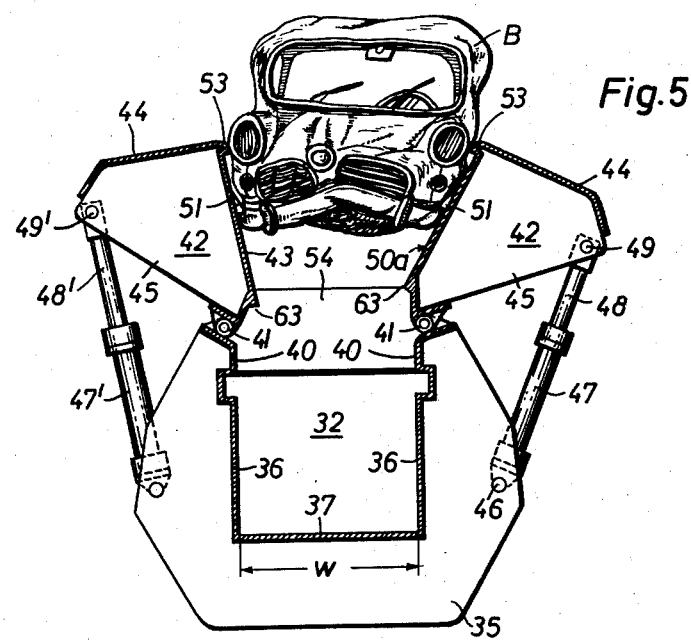
Figure 6:
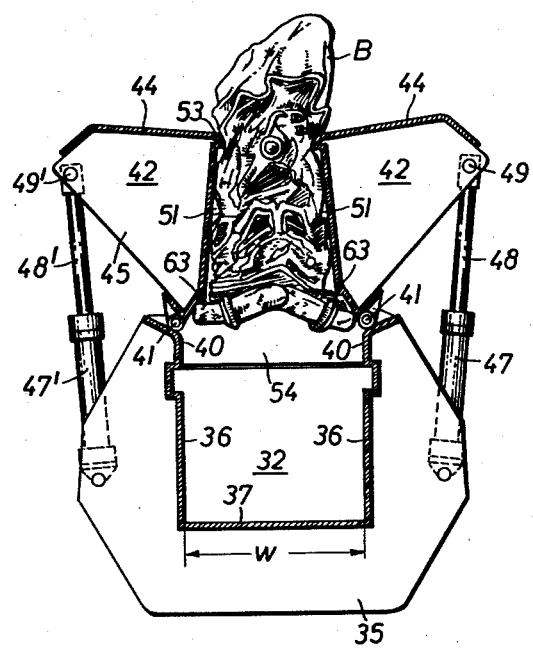
Figure 7:
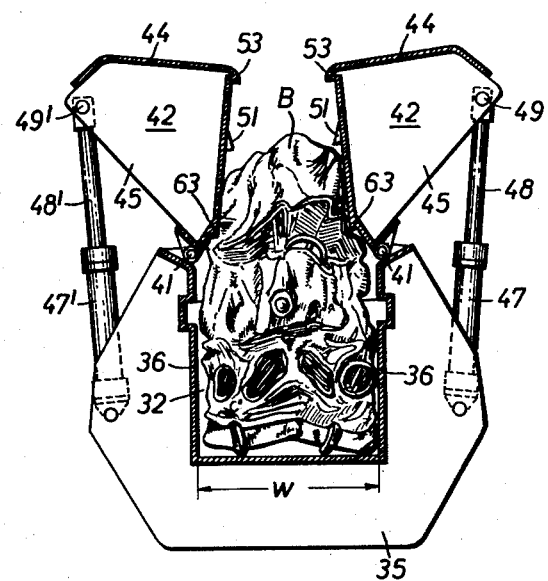

An automobile body is placed upon the working faces 50 of the fully opened jaws 42 as shown in FIG. 4 and the jaws 42 are operated either individually or collectively by hydraulic cylinders 47, 47′ in a manner judged by the operator of the machine until approximately the position shown in FIG. 5 is reached. Thereafter the jaws 42 are again opened so that the scrap piece enters deeper into the space between the jaws 42 as illustrated in FIG. 6 whereupon the jaws are again actuated as shown in FIGS. 6 and 7 to complete the compressing action by reducing, the oversized scrap pieces to a width not exceeding the width w of the charging box 32; thus upon a slight reopening of the jaws such scrap piece will freely fall into the box in front of the ram head 31 as illustrated in FIG. 7.

The scrap introduced into the charging box 32 is then pushed forward by the ram head 31 through the frame opening 22 towards and between the operating means i.e. shears and/or pressrams of the machine. The frontal portion of the top wall 56 of said opening 22, which has a height substantially not smaller than that of the sidewalls of the charging box, is preferably upwardly tapered as shown in FIG. 1 to facilitate the entrance of scrap to the operating means of the machine under the pressure exercised by the advancing ram head 31. The frontal part of the scrap piece forced into said opening 22 is pressed down by the press ram or rams 29 (FIG. 11) and is thereafter moved between the shears 23, 25 to be cut. It will be well understood that the operation described before is repeated until the rear portion of the scrap piece reaches said shears or other operational means of the machine.

Figure 9:
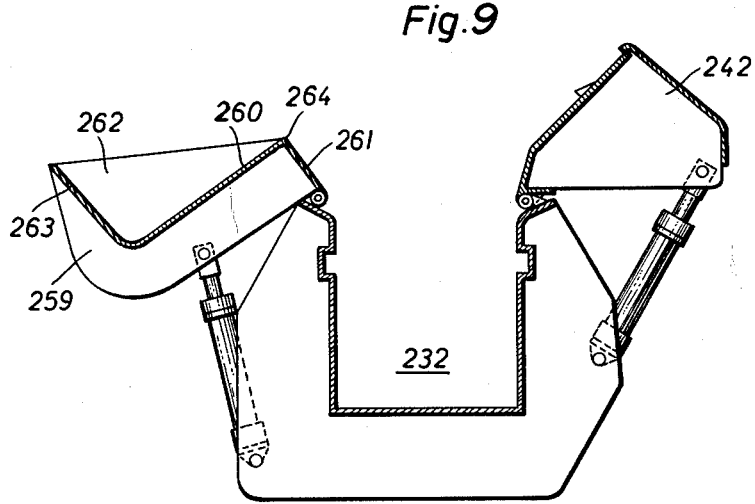
FIG. 9 shows a cross-sectional view of still another modified embodiment of my new charging box.

My device may be further modified as illustrated in FIG. 9. In this embodiment the jaw 242 conforms at least substantially to the jaw 42 of the first described embodiment whereas the other jaw 259 is differently shaped. Its sectional working faces 260, 261 separated by the bend 264 enclose a substantially right angle and the outer section 260 extends into a bent off section 263 with which it forms a tipping trough 262. This tipping trough 262 may be supplied with scrap while the charging box 232 is still loaded. Small scrap assembled in the trough 262 may be delivered into the charging box 232 by simply swinging the jaw 259 inwardly while the jaw 242 is at rest. Oversized scrap pieces placed into said trough 262 are reduced in size by the compressing action of the jaw 242 and of the working faces 261, 260 of the swingable jaw 259 before being delivered into the charging box 232.

While specific embodiments of my invention have been shown and described in detail to illustrate the application of the principles of my invention, it will be well understood that the same may be otherwise embodied without departing from such principles and without avoiding the scope of the appended claims.

What I claim as my invention is:

1. A charging device for a machine for operating on oversized metal scrap or the like comprising in combination
   (a) an elongated receptacle open at both ends and having a bottom wall, a pair of opposed upright side walls longitudinally adjoining said bottom wall and a top opening between the upper edges of said side walls;
   (b) a reciprocable ram entering said receptacle through one of its open ends and pushing material out of said receptacle through the other open end into said operating machine;
   (c) a pair of cooperating compacting jaws adapted to operate on metal scarp; each jaw extending longitudinally substantially the full length of said receptacle outside thereof and hinged to the upper edge of one of said side walls for a swinging movement between a first or receiving position adapted to support scrap exceeding in size the width of the opening and a second or final operating position;
   (d) a working face on each jaw; said working faces in said first position diverging away from said top opening to form a support for scrap exceeding in size the width of said opening and to be compacted by the jaws when the same swing towards each other into said second position, and in said second or final operating position converging away from said top opening to confine at any level a clearance smaller than the width of said opening to compact the scrap to a size smaller than that of said opening; thereby permitting the operated on metal scrap to fall freely and unaided into the receptacle when released by the jaws and to have clearance with said side walls for movement by said ram along said receptacle.
   (e) an actuating means for said reciprocable ram and and for said swingable jaws.

2. A charging box according to claim 1 wherein at least one of the compacting jaws is divided into individually operable component jaws.

3. A charging box according to claim 1 wherein the working face of at least one jaw includes a longitudinally extending convex bend so dividing the working face into an inner portion adjoining the open top of the box and an outer portion that each of said portions in the second or final operating position confines at any level a clearance smaller than the width of the opening.

4. A charging box according to claim 3, the said one jaw further comprising a bent off extension of the outer portion of the working face thereof forming therewith a trough.

References Cited in the file of this patent

UNITED STATES PATENTS

| | | | |
|---|---|---|---|
| 464,039 | Richard | Dec. 1, | 1891 |
| 680,841 | Chapman | Aug. 20, | 1901 |
| 987,869 | Epps | Mar. 28, | 1911 |
| 1,223,211 | Starks | Apr. 17, | 1917 |
| 1,620,659 | Hodgkinson | Mar. 15, | 1927 |
| 1,880,227 | Addler | Oct. 4, | 1932 |
| 1,960,501 | Maull | May 29, | 1934 |
| 2,707,081 | Schmidtmann | Apr. 26, | 1955 |
| 2,920,554 | Bunke | Jan. 12, | 1960 |
| 2,932,247 | Thompson | Apr. 12, | 1960 |
| 2,934,002 | Holt | Apr. 26, | 1960 |
| 2,960,928 | Anderson | Nov. 22, | 1960 |

FOREIGN PATENTS

| | | |
|---|---|---|
| 311,408 | Germany | Mar. 19, 1919 |